F. N. Clark,
Indicator.
No. 9165.    Patented Aug. 3, 1852.
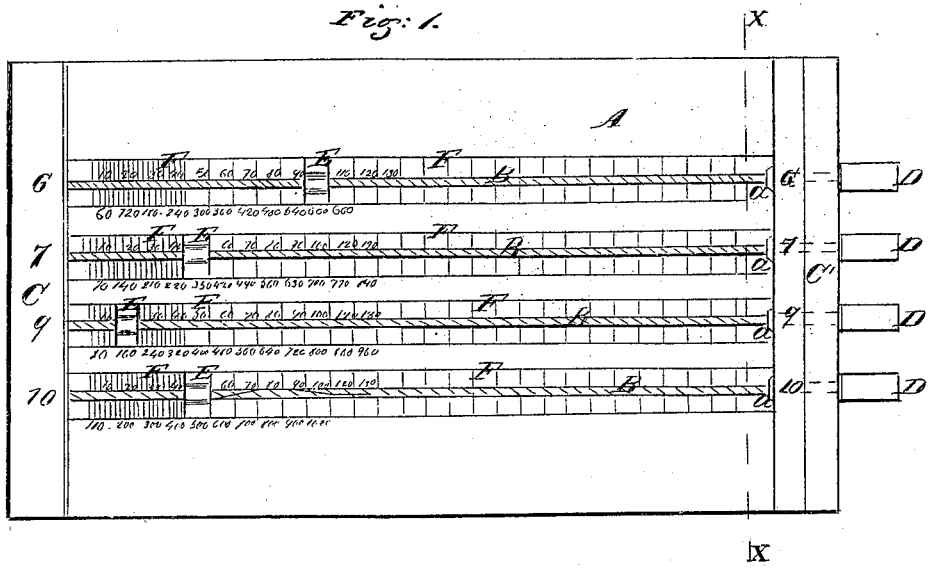
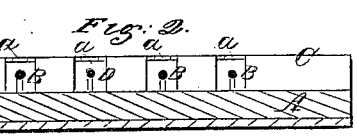
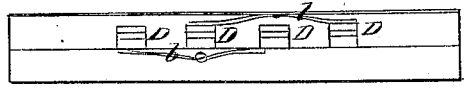

UNITED STATES PATENT OFFICE.

FRANCIS N. CLARKE, OF CHICAGO, ILLINOIS.

TALLY-BOARD.

Specification of Letters Patent No. 9,165, dated August 3, 1852.

*To all whom it may concern:*

Be it known that I, FRANCIS N. CLARKE, of Chicago, in the county of Cook and State of Illinois, have invented a new and useful article for keeping a correct account of a cargo of lumber or any other commodity as it is being discharged, and which I term a "tally-board;" and I do hereby declare that the following is a full, clear, and exact description of the construction of the same and the manner in which it is used, reference being had to the annexed drawings, making a part of this specification, in which—

Figure 1 is a plan or top view of the tally board. Fig. 2 is a transverse section of ditto, taken at the line X, X, Fig. 1, showing the metal strips which hold the screw rods in their proper places. Fig. 3 is an end view of ditto, showing the springs which act upon the thumb pieces.

Similar letters of reference indicate corresponding parts in each of the several figures.

The nature of my invention consists in having a series of screw rods properly secured over a board said screw rods having nuts upon them which are moved either to the right or left according as the rods are turned. Upon the board and underneath each nut there is a space which is graduated in any proper manner. By turning either screw rod the nut on the rod is moved and the graduated space shows how far the nut has moved, and the amount tallied.

To enable others skilled in the art to make and use my invention I will proceed to describe its construction and the manner in which it is operated.

A, represents the board over which the screw rods B, B, B, B, are placed, the screw rods fitting in cleats C', C, which project upward at the ends of the board. The rods pass entirely through the cleat C', and terminate in thumb pieces D. The rods have small grooves or recesses around them near the cleat C', in which the metal strips (*a*) fit, Figs. 1 and 2, and prevent the rods from moving laterally or withdrawing from the cleats.

E, E, E, E, are nuts which work on the screw rods B, the under surfaces of the nuts resting on the board A.

F, F, F, F, are spaces on the board running its whole length. These spaces are graduated, see Fig. 1, and indicate the distance the nuts have moved or the number of times the rods have been turned.

The ordinary mode of tallying or keeping account of the number of bushels, barrels, feet of timber, et cetera, delivered is by making thus /W/ /W/ /W/, a mark being made every time a number is called or an article delivered. By my implement one of the rods is turned one half around and the nut is moved say one degree forward. This depends, however, upon the way in which the spaces are graduated and also upon the pitch of the screw. For instance if the spaces are closely graduated and the screw rods have a rapid pitch, the nuts may move one degre at a half turn of the rods. The thumb pieces D, at the ends of the screw rods have springs (*b*) which bear upon them and prevent the rods from being accidentally turned, see Fig. 3, the springs bearing against the flat surfaces of the thumb pieces.

To use the implement the nuts may be placed at the left end of the board where the graduated spaces commence, and every time a number is called or an article delivered one of the screw rods B is turned by applying the thumb and finger to the thumb piece, one half around and the nut moves one degree. Thus an accurate account is obtained of articles delivered, the nut indicating on the graduated space the number of half turns of the screw rod.

Any convenient number of screw rods may be used, so that different articles may be tallied, if the cargo contains a variety of articles.

I do not confine myself to any particular form or manner of arranging the screw rods over the board, nor to any particular manner of graduating the spaces; but—

What I claim as new, and desire to secure by Letters Patent, is—

The manner of tallying or keeping an account of articles as they are delivered or moved, by means of screw rods B, having nuts E, upon them, said nuts being placed over graduated spaces F, which indicate the distance the nuts have moved or give the number of turns or half turns of the rods, the rods, nuts and spaces being arranged as shown and described or in any other manner substantially the same.

FRANCIS N. CLARKE.

Witnesses:
T. B. DOGGITS,
C. H. QUINLAN.